(12) United States Patent
Betz et al.

(10) Patent No.: US 7,567,184 B2
(45) Date of Patent: Jul. 28, 2009

(54) METHOD FOR ESTABLISHING THE OCCUPATION OF A VEHICLE SEAT

(75) Inventors: Volkmar Betz, Ampfing (DE); Thomas Stifter, Illereichen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 10/964,809

(22) Filed: Oct. 15, 2004

(65) Prior Publication Data
US 2008/0204211 A1   Aug. 28, 2008

Related U.S. Application Data

(63) Continuation of application No. PCT/DE03/01164, filed on Apr. 9, 2003.

(30) Foreign Application Priority Data

Apr. 19, 2002   (DE) ................ 102 17 690

(51) Int. Cl.
*G08B 21/00* (2006.01)
(52) U.S. Cl. ............... 340/667; 340/665; 340/666; 701/45; 180/273
(58) Field of Classification Search ............ 340/667
See application file for complete search history.

(56) References Cited

U.S. PATENT DOCUMENTS 5,732,375 A   3/1998   Cashler
6,487,483 B1   11/2002   Gillis

FOREIGN PATENT DOCUMENTS

| DE | 100 47 189 C1 | 2/2002 |
|---|---|---|
| DE | 100 47 191 A1 | 5/2002 |
| DE | 102 23 218 A1 | 1/2003 |
| EP | 0 891 898 A1 | 1/1999 |
| WO | WO 01/85497 A1 | 11/2001 |
| WO | WO 02/04250 A2 | 1/2002 |

OTHER PUBLICATIONS

Raymond Brodeur, et al., "The Initial and Postural Attitudes of Driver Occupants, Posture", Ergonomic Research Laboratories, Jun. 21, 1996, pp. 1-72, XP-002251203.
Roland Kruse, "Perzeptionsadaquate Parametrisierung von objektiven Sitzdruckvertellungen beim Menschen" Universitat Oldenburg, Dec. 23, 2001. XP002251106.

*Primary Examiner*—Davetta W Goins
*Assistant Examiner*—Samuel J Walk
(74) *Attorney, Agent, or Firm*—Crowell & Moring LLP

(57) ABSTRACT

The invention relates to a method for differentiating between people and other objects on vehicle seats, by recording and evaluating the pressure distribution caused on the seat by said people and objects, the mean deviation of the signal at a certain position in relation to the mean signal of the adjacent region enabling the differentiation between people and other objects to be made. The invention is advantageous in that only few criteria are required and the criteria are not bound to any specific sensor structures (metrical, discrete etc.). Furthermore, where required, the individual criteria need only be combined in a simple manner.

46 Claims, 4 Drawing Sheets

| 0 | 0 | 68 | 82 | 0 | 0 | 0 | 0 | 68 | 54 | 0 | 0 |
|---|---|---|---|---|---|---|---|---|---|---|---|
| 0 | 47 | 76 | 87 | 55 | 0 | 0 | 52 | 68 | 60 | 45 | 0 |
| 0 | 52 | 70 | 79 | 59 | 0 | 0 | 68 | 51 | 67 | 75 | 41 |
| 0 | 67 | 60 | 156 | 104 | 0 | 0 | 64 | 97 | 56 | 68 | 40 |
| 0 | 83 | 102 | 111 | 89 | 61 | 62 | 128 | 92 | 134 | 105 | 39 |
| 0 | 61 | 72 | 108 | 82 | 62 | 60 | 96 | 94 | 125 | 98 | 39 |
| 0 | 60 | 70 | 95 | 86 | 71 | 72 | 95 | 78 | 123 | 54 | 38 |
| 0 | 0 | 59 | 70 | 132 | 136 | 100 | 73 | 52 | 103 | 0 | 0 |
| 0 | 0 | 0 | 0 | 0 | 0 | 0 | 0 | 0 | 0 | 0 | 0 |

FIG. 3

| 0 | 0 | 0 | 64 | 58 | 54 | 54 | 55 | 55 | 0 | 0 | 0 |
|---|---|---|---|---|---|---|---|---|---|---|---|
| 0 | 0 | 48 | 0 | 0 | 0 | 0 | 0 | 0 | 52 | 0 | 0 |
| 0 | 0 | 83 | 54 | 48 | 0 | 48 | 45 | 46 | 71 | 0 | 0 |
| 0 | 0 | 59 | 65 | 59 | 0 | 0 | 70 | 49 | 45 | 0 | 0 |
| 0 | 0 | 69 | 38 | 21 | 0 | 0 | 0 | 20 | 28 | 0 | 0 |
| 0 | 0 | 50 | 0 | 0 | 0 | 0 | 0 | 0 | 59 | 0 | 0 |
| 0 | 0 | 77 | 50 | 46 | 41 | 0 | 40 | 40 | 54 | 0 | 0 |
| 0 | 0 | 76 | 55 | 55 | 74 | 62 | 52 | 37 | 149 | 0 | 0 |
| 0 | 0 | 0 | 0 | 0 | 0 | 0 | 0 | 0 | 0 | 0 | 0 |

FIG. 4

METHOD FOR ESTABLISHING THE OCCUPATION OF A VEHICLE SEAT

CROSS-REFERENCE TO RELATED APPLICATIONS

This application is a continuation of PCT Application No. PCT/DE03/01164 filed on Apr. 9, 2003, which claims priority to German Application No. 102 17 690.5 filed Apr. 19, 2002.

BACKGROUND AND SUMMARY OF THE INVENTION

The present invention relates to a method of differentiating between persons and other objects on vehicle seats by sensing and evaluating the pressure distribution caused by them on the seat. In particular, this method is used to differentiate whether a seat is occupied by a person or a child seat in order to, for example, prevent activation of an air bag if the seat is occupied by a child seat, in contrast to being occupied by a person.

The occupants of a motor vehicle are normally protected from the effects of a collision of the vehicle by restraining systems, among others, for example, by one or more air bags. In this case, a differentiation has to be made as to whether a seat is occupied by a child seat or by a person. In the case of a child seat, the air bag should not be triggered because of the possible lethal effect on the child, particularly if the child seat is oriented against the driving direction. In the case of a person, the air bag should be triggered in order to protect the person.

Furthermore, it is desirable to receive additional information concerning the type of seat occupation from the participating sensor system in order to be able to react in a flexible manner. Thus, there are endeavors, for example, to inflate an air bag to an extent which varies with the type of accident or with the crash intensity; to also use side air bags in a supplementary manner, if required; to activate belt tightening devices at a different intensities depending on the requirement, etc. If it is determined that the seat is occupied by an adult person, it is additionally desirable to precisely know the person's sitting position and react to it in a flexible manner. Sitting positions also exist for adults in which the inflation of an air bag is not recommended under certain circumstances because there is the risk of great harm to the health of the passenger.

For economical reasons, all attempts to solve these problems additionally have to achieve cost effectiveness in order for the method used to be applicable in series production. The sensor system used should be producible in a cost-effective manner and should be capable of being integrated in the vehicle and be serviced at acceptable expenditures.

Among others, camera systems, optical sensors and ultrasonic sensors can be used as sensor systems, as well as pressure sensors in the vehicle seats. Although camera systems can supply very extensive information concerning the events in the vehicle occupant compartment, they are expensive in series production and may also require extensive maintenance. In addition, attention should be paid to shading in the case of all sensors operating with light or ultrasound. Pressures sensors in the vehicle seats can be produced in a cost-effective manner, are robust, require low-maintenance and are not affected by the shading problem.

The first attempts were limited to a determination of the total weight by means of pressure sensors. This solution is unsatisfactory because, in the case of an adult person, a portion of his/her weight is taken-up by the backrest as well as by the floor via one's feet which are, as a rule, placed on the vehicle floor. Measuring using sensors integrated in the vehicle seat will, therefore, always only supply a lower limit of the occupant's total weight. It should also be considered here that child seats are placed in the vehicle with a pretensioned belt and therefore may load the seat by a force which is clearly higher than their own weight. The limits between a low-weight adult and a heavy child seat can, therefore, easily become blurred if only the total weight is used as a criterion.

For example, in Luxembourg Patent document LU 90106 and U.S. Pat. No. 6,348,663, the pressure pattern of a seated person is analyzed in such a manner that the seat surface is divided into several sectors and the weight distribution onto these sectors is determined and analyzed. A conclusion is drawn therefrom concerning the person's height or the person's weight or concerning both. Both constructions contain no criteria which differentiate persons from other objects.

U.S. Pat. No. 6,243,634 discloses sensors in the entire seat, thus also in the backrest, in order to achieve an improved determination of the weight, of the center of gravity and of the position. As a result, an improved detection of non-optimal seat positions is endeavored, for example, whether a person is bending forward. However, this document does not relate to a differentiation between persons and other objects, no criterion being given for this purpose.

U.S. Pat. Nos. 5,941,560 and 6,170,866 explicitly mention the protection of children in child seats in their title. A prerequisite in both documents is the existence of a sensor system, which is not described in detail and which is capable of detecting child seats. As a reaction, either a signal is emitted for informing the driver, or the vehicle seat is automatically moved toward the rear. No analysis of the pressure pattern is carried out here.

In U.S. Pat. No. 6,366,200, a differentiation is made between an occupation of the vehicle seat by a child, an adult or a child seat. The criteria are, on the one hand, the weight and, on the other hand, the signal of a sensor which is described by the term "living body proximity sensor"; that is, a sensor which indicates the proximity of a living object.

In U.S. Pat. No. 6,272,411, the signals of several sensors are combined in order to obtain information which is as complete as possible concerning the status of the seat occupation. It is to be determined whether the seat is vacant or occupied, and if it is occupied, how it is occupied. The invention significantly stresses the analysis of dynamic information; that is, sensor signals are detected as a function of time and are periodically compared with a databank in order to be able to derive additional information from the time response. On the basis of this information, a decision is made not only concerning the use or non-use of the air bag, but also concerning the control of the inflation intensity, concerning side air bags, etc.

U.S. Pat. No. 6,252,240 operates with a combination of several sensors, among others, position-sensitive optical sensors, weight sensors and speed sensors. Probabilities are computed for defined scenarios, and the air bag is controlled corresponding to the most probable scenario. In this case, no analysis of pressure patterns is used for differentiating between persons and other objects.

It is an object of the present invention to provide a method of detecting a pattern on vehicle seats, which method reliably differentiates between persons and other objects, particularly child seats. The methods should also be simple from a constructional point of view and avoid the above-mentioned disadvantages of the prior art.

According to the invention, this object is achieved by providing a method of differentiating between persons and other objects on vehicle seats by sensing and evaluating the pressure distribution caused by them on the seat, wherein a mean deviation of the signal at one position from the mean signal of its neighborhood differs between persons and other objects.

A first embodiment of the invention (criterion of local flatness) evaluates statistically how much the pressure signal at one position differs from its neighborhood.

The essential advantages achievable by means of the invention consist of the fact that only few criteria are required, and the criteria are not dependent on special sensor structures (matrix-like, discrete, etc.). In addition, to the extent that it is required, only a simple logical linking of the individual criteria has to be carried out. Other methods according to the prior art have to combine the individual criteria with high-expenditure algorithms.

A neighborhood in the sense of the invention consists of the fact that neighboring positions belong to a common cohesive area. Mathematically, an area is cohesive if two arbitrary points of the area can be connected by a connection path which extends completely within the area, and thus never leaves the area.

The advantages of this further development essentially consist of the fact that it is a statistical method which is independent of the shape of the object situated on the seat or of the person situated on the seat.

Another embodiment of the invention excludes a person when defined constellations of areas occur which are more characteristic of technical objects than of persons. In particular, in the case of a matrix-shaped sensor arrangement, a technical object, thus, for example, a child seat, can easily generate a pressure pattern in which an entire column of sensors supplies no signal. There are child seats which have two runners on their underbody which extend in the driving direction. Their pressure pattern may easily have one or more columns in which not a single sensor supplies a signal. Such an arrangement virtually does not occur in the case of a person.

A further embodiment according to the invention excludes a person if no signal, or only a very slight signal, is present in a certain area. For example, in the case of matrix-shaped sensor arrangements, child seats frequently have few or even no sensor signals at all in an area in the interior of the seat pattern.

The advantages of the further developments according to the invention consist essentially of the fact that these further developments are based on no absolute pressure value. In the case of a discrete pressure distribution, they are not sensitive to a special calibration curve of the pressure sensors, but only possibly to the position of their activation points. In addition, they are, as a rule, successful in simple constellations.

The methods will be described in the following by means of preferred embodiments as examples. For this purpose, reference is made to the drawings, in which the same reference numbers in each case refer to identical details.

BRIEF DESCRIPTION OF THE DRAWINGS

FIG. 3 is a chart illustrating a typical pressure pattern of an adult person;

FIG. 4 is a chart illustrating a typical pressure pattern of a child seat;

FIG. 6 is a diagrammatic view of a possible typical neighborhood for an individual sensor in a sensor arrangement, which is not matrix-like;

FIG. 8 is a diagrammatic view of a possible "constellation" in a sensor arrangement, which is not matrix-like.

DETAILED DESCRIPTION OF THE DRAWINGS

Figure 1:
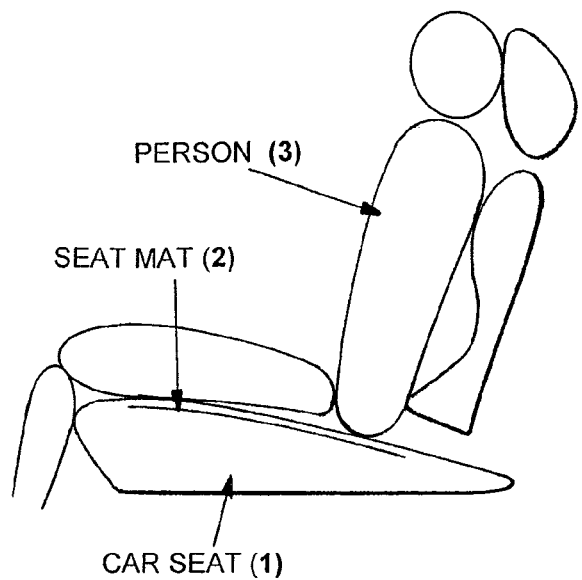
FIG. 1 is a schematic view of the occupation of a vehicle seat by an adult person.
Figure 2:
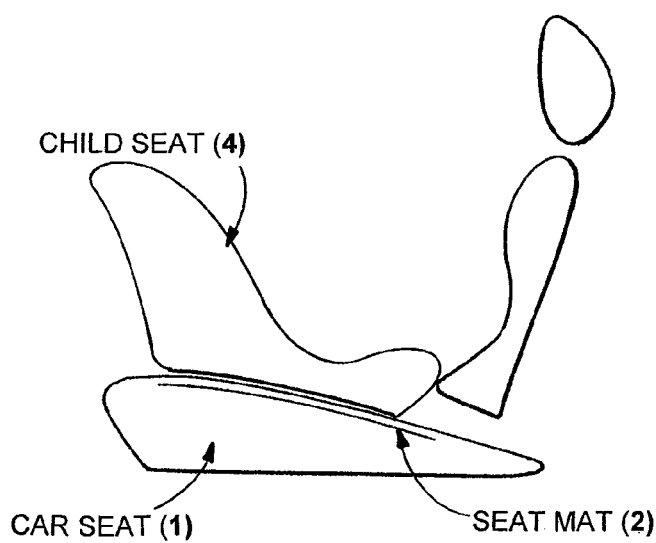
FIG. 2 is a schematic view of the occupation by a typical child seat.

FIG. 1 illustrates a vehicle seat 1 with a seat mat 2 equipped with pressure sensors as well as a person 3 sitting on the seat mat 2. FIG. 2 shows the motor vehicle seat 1 with a child seat 4 fastened thereon as an alternative.

In this preferred embodiment, a sensor mat on the seat surface supplies a pressure pattern consisting of 9*12 sensors (9 rows, 12 columns) with an 8-bit resolution. The sensors are not necessarily distributed in a completely rectangular/matrix-shaped manner, but fairly close thereto. However, the arrangement can be varied within wide margins.

The pressure pattern is examined as to whether one of the two following two criteria apply to a child seat (OR operation):

In the following, a preferred embodiment of the method according to the invention will be explained in detail. ("local flatness"):

With the exception of the margin sensors, a mean deviation with respect to its neighbors is computed for each sensor. It is assumed here that $s_{ij}$ is the matrix with the sensor values. In our example, the row index i runs from 1 to 9; the column index j runs from 1 to 12. For each given $s_{ij}$, with the exception of the margin values, thus the values with i=1, i=9, j=1 or j=12, the 3×3 submatrix $$\begin{pmatrix} s_{-1+i,-1+j} & s_{-1+i,j} & s_{-1+i,1+j} \\ s_{i,-1+j} & s_{i,j} & s_{i,1+j} \\ s_{1+i,-1+j} & s_{1+i,j} & s_{1+i,1+j} \end{pmatrix}$$

is then formed, thus that 3×3 submatrix, whose center is represented by the respective element $s_{ij}$. Subsequently, the respective mean value $$m_{ij} = \sum_{j'=j-1}^{j'=j+1} \sum_{i'=i-1}^{i'=i+1} s_{i'j'}$$

and the respective standard deviation $$\sigma_{i,j} = \sum_{j'=j-1}^{j'=j+1} \sum_{i'=i-1}^{i'=i+1} (s_{i'j'} - m_{ij})^2$$

are formed of each 3×3 submatrix as well as the relative standard deviation $$\frac{\sigma_{ij}}{m_{ij}}$$

This relative standard deviation is a measurement of the flatness of the pressure distribution at the respective point. The flatter this pressure distribution, the lower the standard deviation. In this case, the scaling to the mean value is important in order to be able to mutually compare points having different sensor values.

In this preferred embodiment, the list of these values is separated by means of a threshold sl into two sections for a data set. A relationship is established between the number $N_{>threshold}$ of the values greater than this threshold and the total number $N_{total}$; that is, the following quotient is formed:

$$N_{relative} = \frac{N_{Gesamt}}{N_{>Schwelle}}$$

This characteristic indicates how many sensors deviate considerably from their neighborhood. The more sensors deviate, the smaller the ratio.

As mentioned above, FIGS. 3 and 4 are examples of the obtained pressure pattern distributions for the two variants illustrated in FIG. 1 (person) and FIG. 2 (child seat). The numerical values represent the signals of the pressure sensors of the sensor mat. The relationship of the signals with respect to the pressure values is given by a calibration curve. First, the calibration curve extends to an initial pressure value (activation point) in a flat manner; that is, at pressure values below the initial pressure value, the pressure sensor emits no signal. Above the initial pressure value, the sensor emits a signal which is a monotonically growing function of the pressure. For a threshold of 0.2, the above-mentioned relationship in the case of the pressure pattern of FIG. 3 (adult person) has a value of 2.26; in the case of the pressure pattern of FIG. 4 (child seat), it has a value of 1.08.

The differentiation between child seats and persons is then made in that, a second threshold is set for $N_{relative}$. In the case of the examined data sets, particularly a second threshold of 1.22 was found to be successful. At lower values, the pressure pattern is classified as a child seat; at higher values, it is classified as a person.

Figure 5:
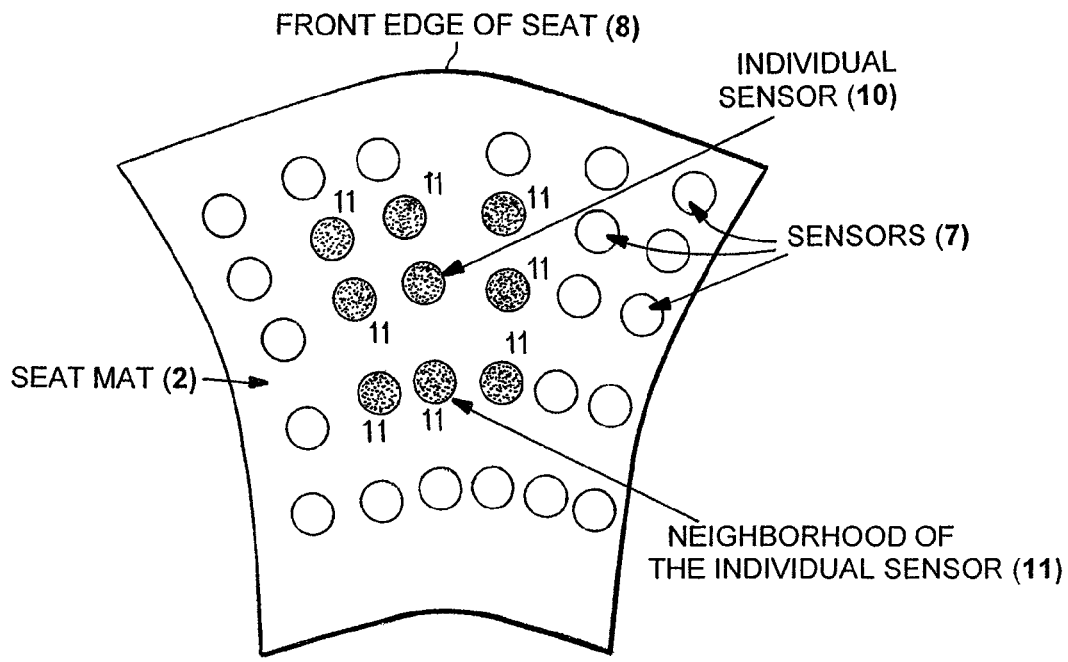
FIG. 5 is a diagrammatic view of a typical "neighborhood" for an individual sensor in a matrix-like sensor arrangement.
Figure 6:
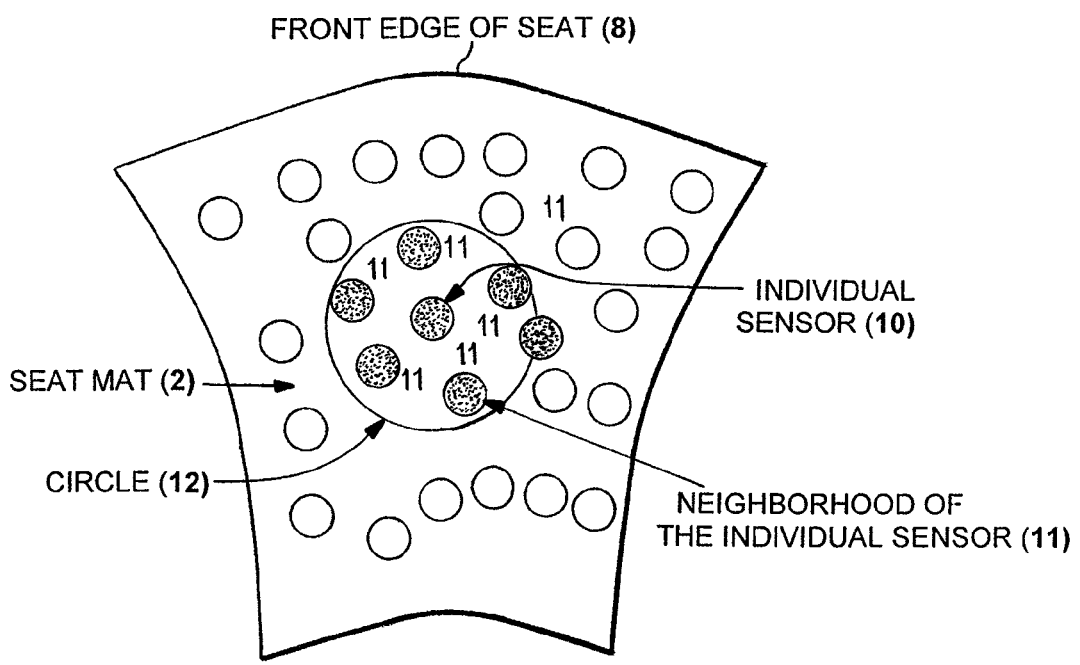

It is clear that this embodiment of the invention can also be implemented in a different manner than described in this preferred embodiment. In particular, in an alternative embodiment with a matrix-shaped sensor arrangement, a larger submatrix, such as 4×4 or 5×5, can be used for evaluating the neighborhood. Discrete sensor arrangements also do not have to have a matrix-like structure, but can be present in a freely distributed manner. FIG. 5 shows an example of a matrix-like sensor arrangement. FIG. 6 shows an example of a sensor arrangement which is not similar to a matrix.

In another embodiment, the neighborhood could, for example, be defined by way of the geometrical distance; that is, all sensors situated within a circle of a defined radius around a sensor, are considered neighbors. In particular, in FIG. 5, the neighborhood 11 of an individual sensor 10 is represented for a matrix-like sensor arrangement. FIG. 6 supplies an example of the definition of the neighborhood 11 of an individual sensor 10 by a circle 12 at a certain geometrical distance around an individual sensor 10. Additional embodiments with other definitions of a neighborhood are also templated.

For example, all distances from each sensor to the residual sensors could also be determined; these distances could be arranged in a rising manner, and then a certain number of sensors—counted from the start of this list—could be considered as the neighborhood of the sensor.

Another possible definition of a neighborhood is obtained when, as known in mathematics, instead of the Euclidian norm, another norm is selected, for example, the maximum norm. In the case of the maximum norm, for example, the indication of a rectangle corresponds to the circle with a certain radius (Euclidian norm) around a sensor.

These examples should not be understood such that all points of the cohesive area always have to be considered. Although it should be possible to indicate a cohesive area within which all points considered as neighboring are situated, other points, which are not neighboring, can also be part of the area.

For example, as mentioned above, the neighborhood can be defined by way of the Euclidian norm, but then a center of the circle can be explicitly excluded. Or, for example, in a matrix-like sensor arrangement, the neighborhood can be defined, as mentioned above, by way of the maximum norm, but then the diagonal elements of the matrix can be explicitly excluded.

The cohesive area also does not have to be the same at all points of the pressure distribution. For example, in the case of a definition of the neighborhood by way of the Euclidian norm, it is not necessary for the radius of the circle to be the same over the entire pressure distribution. It can vary as a function of the location, for example, by means of an arbitrary mathematical function.

In the case of a discrete pressure distribution, the neighborhood can even be defined such that it is explicitly indicated which sensors are considered to be neighboring a certain sensor.

In another embodiment, the pressure distribution could also be continuous. The above-described method can then be analogously applied, for example, in an embodiment in that the continuous pressure distribution is evaluated at a grid of supporting points and the method is applied thereto.

In the following, a preferred embodiment of the method according to the invention will be explained in detail ("technical equipment criterion"):

This method is most easily explained by means of the embodiment of discrete sensors arranged in a matrix shape. In such an arrangement, it is, for example, very improbable for a person's seat pattern that an entire column of sensors do not supply a signal when all other columns supply a signal. However, technical equipment, such as a child seat, could do so very easily, for example, if it has straight edges, angular or firm structures.

This embodiment can easily be expanded, and additional constellations of active and inactive columns can be named, which would occur extremely rarely in the case of a person, but could easily occur in the case of technical equipment.

In this preferred embodiment, for example, the selection of constellations 111110, 111100, 001111, 111111, 011101, 111101, 101110, 001111, 101111, 111010, 111011, 110110, 110111, 010111 for columns 4 to 9 has been successful for persons; that is, each of these constellations is evaluated as a person. Here, a 1 represents an active column, that is, a column which contains sensors with a signal greater than zero. 0 correspondingly represents an inactive column, that is, a column in which all sensor values are zero.

Also, the limitation to a matrix-shaped sensor arrangement mentioned in this preferred embodiment is naturally not necessary. In other embodiments, a different partitioning of the total area, in which the pressure distribution takes place, into disjoint partial areas can be used.

Figure 7:
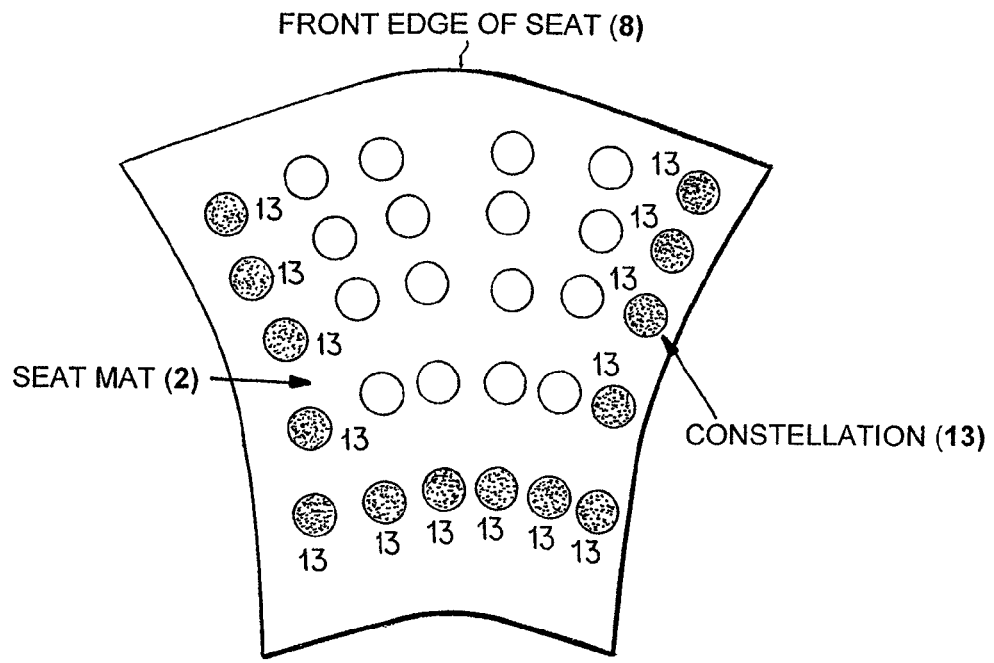
FIG. 7 is a diagrammatic view of a possible "constellation" in a matrix-like sensor arrangement.
Figure 8:
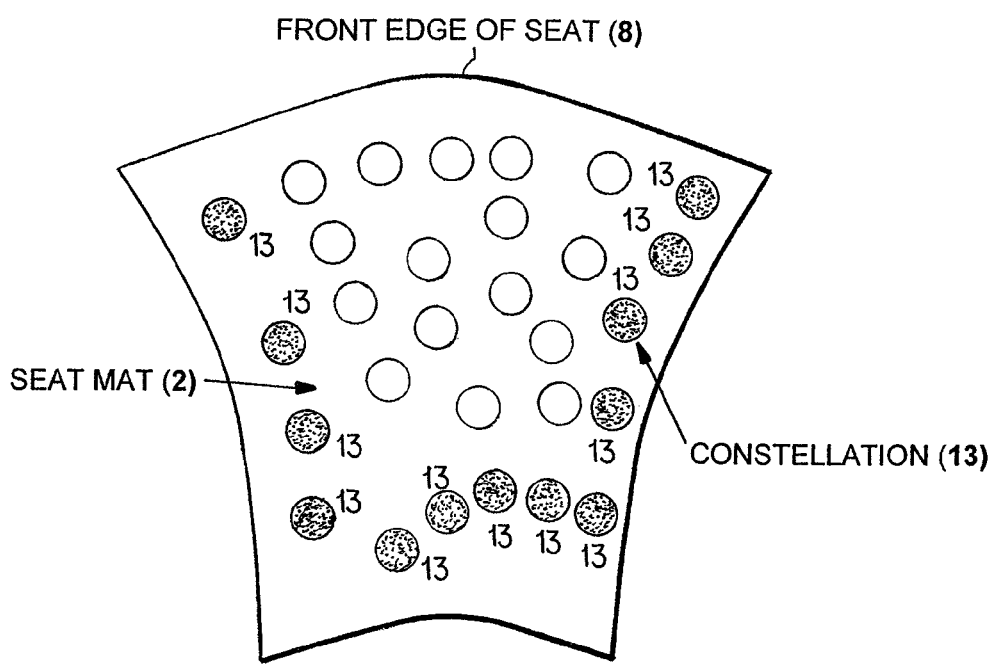

In particular, a U-shaped constellation 13 of sensors is illustrated in FIG. 7 in a matrix-like sensor arrangement, and in FIG. 8 in a sensor arrangement which is not similar to a matrix. The two figures show that a matrix-like sensor arrangement is not necessary for defining constellations.

The terminology used herein and in the claims, on the one hand, allows for the possibility of a continuous pressure distribution and, on the other hand, provides, also in the case of discrete pressure sensors, for the possibility of setting a threshold for the suppression of noise.

In the following, a preferred embodiment of the method according to the invention will be described in detail ("hole criterion"):

If, in a targeted manner, a defined partial area of the entire pressure pattern is considered, it is possible to exclude persons when no sensor response whatsoever is present in this partial area, or when only a very low cumulative signal is present, which is below a defined noise threshold.

In a preferred embodiment of the invention, for example, a differentiation is made between child seats and persons in that an area in the center of the pressure pattern is used for this purpose. If this area is selected to be large enough, it is possible for a person to cause no sensor response here only in the case of very rare sitting positions. On the other hand, such "holes" in the pressure pattern very easily occur in the case of a several child seats, which are frequently constructed such that they load at the edge of the seat and not in the center.

One example is the pressure pattern of FIG. 4, which represents a child seat. In the area of Rows 4 to 6 and Columns 6 to 7, this pressure pattern has only zero sensor values. In contrast, the pressure pattern of FIG. 3, which represents an adult, has several sensors with a clear signal in this area.

If a higher stability with respect to noise is desired, the considered area in the center of the pressure pattern could also be selected to clearly be larger. Although, even in the case of a child seat, possible individual sensors may have signals unequal to zero, they will be few in comparison to a person. The separation between persons and child seats would then take place as a result of a suitable threshold for the cumulative signal in this area.

According to a preferred further development of the invention, several criteria will be used in a combined manner, the combination consisting of a logical linking of their individual information. The multiple use of the same criterion, but with different parameters, is a possible variant here. In particular, two, or all three, of the above-described embodiments (criteria) in practice according to a preferred further development of the invention are linked by a logical OR for a child seat (or "non-person"), that is, if at least one of these excludes a person, it is not a person.

A further development is obtained by a limitation to data sets which exceed a certain threshold for the total sum of the sensor values.

The above-described preferred further development should definitely not be understood as a limitation on the scope of the invention. Without departing from the spirit and scope of the invention, a plurality of modifications are templated.

It is, for example, definitely not required to use a discrete sensor arrangement. Embodiments also exist which have a continuous pressure pattern. In the case of a continuous pressure distribution, the cumulative signal mentioned in the claims is analogously understand to be implemented by an integral of the pressure distribution—an averaging by means of the mean value law of integral calculus, in a manner customary in mathematics.

If a discrete sensor arrangement is selected, it is again not necessary to construct the latter in a matrix shape. Without departing from the scope of the invention, in additional embodiments, the sensors can be distributed in any manner, also in an arrangement which makes a division into rows and columns impossible, and in which the neighborhood is defined, for example, only by way of the geometrical distance between the individual sensors. For example, also a pressure pattern which is formed by arbitrarily distributed pressure sensors can be combined with a row-oriented or column-oriented analysis step in that an interpolation function or fit function is connected in-between. The arbitrarily distributed pressure values are then used as supporting steps for such an interpolation or fit function, which then, in turn, is read out again at, for example, rectangularly distributed points. Only the read-out interpolation or fit values are then evaluated in this embodiment by the use of the algorithm.

The pressure pattern can, preferably, be modified by weight functions or calibration. Likewise, in further developments, after a cumulative value formation or averaging, another mathematical operation can be carried out without departing from the scope of the invention.

The invention claimed is:

1. A method for differentiating between persons and objects on a vehicle seat, the method comprising the acts of:
    sensing a pressure distribution occurring on the vehicle seat; and
    evaluating the pressure distribution to differentiate between a person and an object on the vehicle seat in accordance with a mean deviation of a signal at one position from a mean signal neighboring said one position.

2. A method according to claim 1, wherein the act of evaluating further comprises the acts of:
    determining a mean deviation of the signal at several sensor positions from pertaining mean signals of the neighborhoods of said several sensor positions, and deriving a result value therefrom which differentiates between the person and the object.

3. The method according to claim 2, wherein at least one of the signals is subjected to a mathematical function before averaging.

4. The method according to claim 2, wherein a mathematical function is used on the signals after an averaging.

5. The method according to claim 1, wherein at least one of the signals is subjected to a mathematical function before averaging.

6. The method according to claim 5, wherein the mathematical function is one which either monotonically rises or falls.

7. The method according to claim 1, wherein a mathematical function is used on the signals after an averaging.

8. The method according to claim 7, wherein the mathematical function is one which either monotonically rises or falls.

9. The method according to claim 1, wherein the evaluating act occurs only in one partial area of the pressure distribution.

10. The method according to claim 1, wherein the act of evaluating is subjected to a mathematical time-dependent function.

11. The method according to claim 10, wherein the mathematical time-dependent function is a time averaging.

12. The method according to claim 1, wherein an area in which the pressure distribution is determined is a sensor mat having a number of pressure sensors.

13. The method according to claim 1, wherein pressure patterns are not evaluated as a person in a case in which a total intensity of the pressure distribution is below a defined threshold.

14. The method according to claim 1, wherein neighboring points are part of a common cohesive area.

15. A method for differentiating between persons and objects on a vehicle seat, the method comprising the acts of:
sensing a pressure distribution occurring on the seat;
evaluating the pressure distribution by dividing its area into partial areas, wherein certain constellations of active to inactive areas are evaluated as a person, an active area being one in which a cumulative signal is above a defined threshold.

16. The method according to claim 15, wherein the partial areas are neighboring.

17. The method according to claim 16, wherein a combination of the partial areas represents a total area.

18. The method according to claim 15, wherein the partial areas do not mutually overlap.

19. The method according to claim 18, wherein a combination of the partial areas represents a total area.

20. The method according to claim 15, wherein a combination of the partial areas represents a total area.

21. The method according to claim 15, wherein at least one sensor signal is subjected to a mathematical function before the cumulative signal is formed.

22. The method according to claim 21, wherein the mathematical function is one which either monotonically rises or falls.

23. The method according to claim 15, wherein before comparing the cumulative signal with the defined threshold, the cumulative signal is subjected to a mathematical function.

24. The method according to claim 23, wherein the mathematical function is one which either monotonically rises or falls.

25. The method according to claim 15, wherein the evaluating act occurs only in one partial area of the pressure distribution.

26. The method according to claim 15, wherein the act of evaluating is subjected to a mathematical time-dependent function.

27. The method according to claim 26, wherein the mathematical time-dependent function is a time averaging.

28. The method according to claim 15, wherein an area in which the pressure distribution is determined is a sensor mat having a number of pressure sensors.

29. The method according to claim 28, wherein the sensor mat comprises at least three pressure sensors.

30. The method according to claim 15, wherein pressure patterns are not evaluated as a person in a case in which a total intensity of the pressure distribution is below a defined threshold.

31. The method according to claim 15, wherein neighboring points are part of a common cohesive area.

32. The method according to claim 31, wherein the common cohesive area is defined such that two arbitrary points of the area are connectable by a connection path extending completely within the area.

33. A method for differentiating between persons and objects on a vehicle seat, the method comprising the acts of:
sensing a pressure distribution occurring on the vehicle seat;
evaluating the pressure distribution by forming a cumulative signal in a partial area of a total area in which the pressure distribution exists, and deriving a result value from the cumulative signal and a defined threshold, the result value differentiating between a person and an object being on the vehicle seat.

34. The method according to claim 33, wherein the partial area includes a central area, the central area being an area which contains no parts of an edge.

35. The method according to claim 34, wherein the act of logically linking is performed using an OR operation.

36. The method according to claim 35, wherein before performing the logically linking, at least one of the evaluating acts is negated.

37. The method according to claim 33, wherein the evaluating act occurs only in one partial area of the pressure distribution.

38. The method according to claim 33, wherein the act of evaluating is subjected to a mathematical time-dependent function.

39. The method according to claim 38, wherein the mathematical time-dependent function is a time averaging.

40. The method according to claim 33, wherein an area in which the pressure distribution is determined is a sensor mat having a number of pressure sensors.

41. The method according to claim 33, wherein pressure patterns are not evaluated as a person in a case in which a total intensity of the pressure distribution is below a defined threshold.

42. The method according to claim 33, wherein neighboring points are part of a common cohesive area.

43. A method for differentiating between persons and objects on a vehicle seat, the method comprising the acts of:
sensing a pressure distribution occurring on the vehicle seat caused by one of a person and an object; and
performing an evaluation by one or more of the following acts:
a) evaluating the pressure distribution to differentiate between a person and an object on the vehicle seat in accordance with a mean deviation of a signal at one position from a mean signal neighboring said one position;
b) evaluating the pressure distribution by dividing its area into partial areas, wherein certain constellations of active to inactive areas are evaluated as a person, an active area being one in which a cumulative signal is above a defined threshold;
c) evaluating the pressure distribution by forming a cumulative signal in a partial area of a total area in which the pressure distribution exists, and deriving a result value from the cumulative signal and a defined threshold, the result value differentiating between a person and an object being on the vehicle seat; and
logically linking the results of differentiating between the person and another object in accordance with the above evaluating acts.

44. The method according to claim 43, wherein the act of logically linking is performed using an AND operation.

45. The method according to claim 44, wherein before performing the logically linking, at least one of the evaluating acts is negated.

46. The method according to claim 43, wherein several logical operations are combinable with one another in a mathematical bracketing manner.

* * * * *